Sept. 25, 1956 GEORG-WILHELM OETJEN ET AL 2,764,533
DEGASSING AND DISTILLATION OF LIQUIDS IN VACUUM Filed April 25, 1952 2 Sheets-Sheet 2

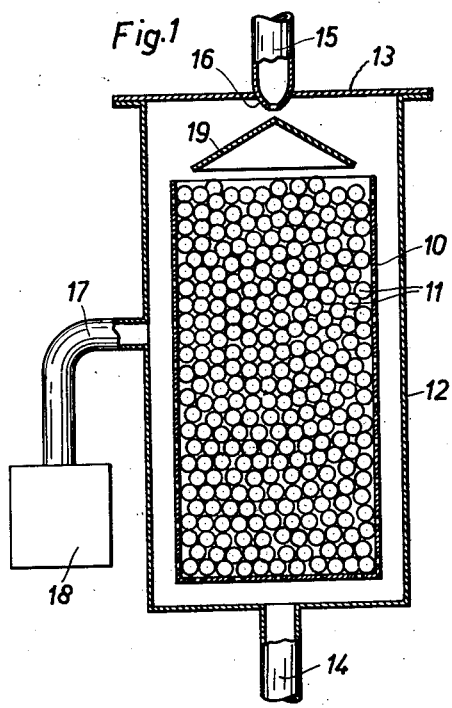
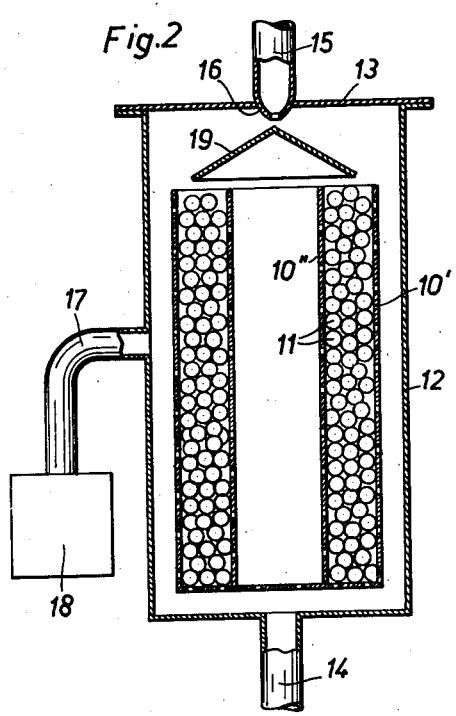
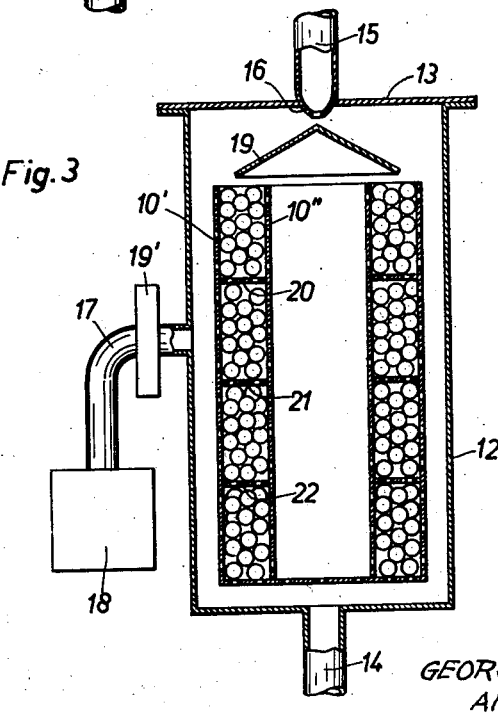

INVENTORS
GEORG-WILHELM OETJEN
AND WILHELM NERGE
BY
THEIR ATTORNEY.

United States Patent Office 2,764,533
Patented Sept. 25, 1956

2,764,533

DEGASSING AND DISTILLATION OF LIQUIDS IN VACUUM

Georg-Wilhelm Oetjen, Koln-Marienburg, and Wilhelm Nerge, Witten (Ruhr), Germany Application April 25, 1952, Serial No. 284,474

Claims priority, application Germany May 4, 1951

13 Claims. (Cl. 202—52)

This invention relates to improvements in or relating to the degassing and distilling of liquids in vacuum.

In order to distribute liquids over relatively large surfaces, it is known to use fill bodies for the washing and cleaning of gases or also for the distillation, fractionization and rectification of liquids and mixtures of liquids.

The method and apparatus known for these processes have the common disadvantage that the fill bodies are arranged in relatively high containers and in one or more layers, with horizontal spaces being left therebetween and separated from each other by sieve-shaped bottoms.

In washing devices, of this type, the washing fluid flows through the fill bodies from the top to the bottom while the gas to be washed is directed in the opposite sense—and in some cases in the same sense.

In distillation and rectification columns, similarly, the vapor flows from the bottom to the top while the condensed vapors are returned in counter-current as a liquid flowing from the top to the bottom.

One of the objects of the invention is to provide columns of fill bodies for the degasification of liquids in vacuum, especially at pressures of less than 10 millimeters of mercury and preferably at pressures of less than 1 millimeter of mercury.

A more specific object of the invention is to arrange the fill bodies in one or more columns surrounded by perforated metal sheets or sieves; the column in turn is surrounded by a vacuum container connected to the vacuum pump equipment.

These and other objects of the invention will be more fully described in the drawings annexed herewith, in which Fig. 1 shows in elevation, partially in section, a form of realizing the invention in which the fill bodies are represented only schematically;

Fig. 2 shows a form of realization differing from that of Fig. 1 in that the fill bodies are arranged in the space between two concentric walls or enclosures;

Fig. 3 shows a form of realization differing from that of Fig. 2 in that the space between inner and outer enclosures for the fill bodies is subdivided at various points by means of horizontal walls of ring-shaped configuration, whereby the column of the fill bodies is subdivided in vertical direction in a manner known per se;

Figure 4:
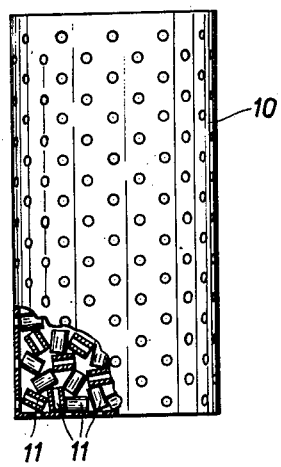

Fig. 4 shows for a column according to Fig. 1 a number of fill bodies of a shape practically used. These bodies are in the form of hollow cylinders. Fig. 4 also shows how these fill bodies are disposed irregularly in the space provided for the fill bodies. Some of these fill bodies are schematically shown in section, others in full.

Figure 5:
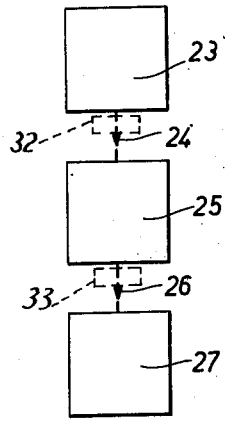
Figure 6:
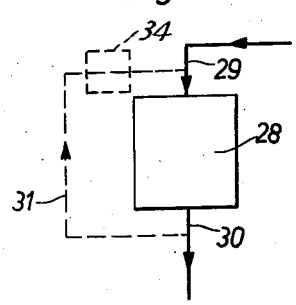

Fig. 5 represents in block diagram the series connection of several fill body columns, and Fig. 6 an arrangement in which the partially degassed liquid leaving a fill body column, is fed back to the input section of that column for further degassing.

In Fig. 1, 10 represents in section a fill body enclosure consisting of perforated sheet metal. Enclosure 10 contains a great number of fill bodies schematically indicated in the form of small circles 11. Fill body column 10, 11 is mounted inside of vacuum container 12 which is closed by cover 13. At the bottom of container 12 there is arranged a line 14 and in cover 13 a line 15 terminating in a fine jet 16. Container 12 is connected over pipe line 17 to vacuum pump equipment 18. Between jet 16 and the upper edge of the fill body enclosure 10, there is arranged a body 19 of conical shape, which will be explained below.

The arrangement of Fig. 1 operates in the following manner:

The liquid to be degassed is supplied over line 15 and forced from jet 16 to spread down thinly over conical body 19. This body serves to guide the liquid to be degassed over the top surface of the fill body column, which thus is distributed practically immediately afterwards and beneath that top surface, over the entire cross-section of the fill body column.

While the liquid is trickling down along the individual irregularly distributed fill bodies, gas will separate from the lquid and escape through openings in wall 10 into the free space between wall 10 and container 12. From there, the gases to be removed are sucked off by vacuum pump equipment 18 over line 17.

In Fig. 2, cylindrical wall 10 of Fig. 1 is replaced by two concentric walls 10' and 10". Otherwise, arrangement of Fig. 2 is substantially in accordance with that of Fig. 1.

The arrangement of Fig. 2 operates in a similar manner as the arrangement of Fig. 1, except that in Fig. 2 the gases emerging from the liquid have a shorter way to go within the layers of fill bodies. In this case, sucking off these gases requires less pressure than in an arrangement of Fig. 1.

In the modification of Fig. 3, a fluid condenser is schematically shown at 19' as built into line 17 and will be described further below in connection with applying the arrangement for topping off and fractional distillation. Otherwise, Fig. 3 resembles Fig. 2, except that the ring-shaped fill body column or the space between the inner and outer fill body enclosure 10' and 10", has ring-shaped intermediary walls 20—22.

Walls 20—22, compared with the arrangement of Fig. 2, subdivide the fill body column additionally and in vertical direction in order still further to reduce pressure loss.

Fig. 4 shows in greater detail the irregular arrangement of the fill bodies 11 in a perforated enclosure 10; by way of example, these bodies are shown to consist of small hollow cylinders 11 of porcelain or metal, which are represented in Fig. 4 partly in section and partly in full.

In order to increase degassing of liquids in any desired manner, several fill body columns according to Figs. 1, 2 or 3 can be arranged in series. The pump equipment used with the different columns can be accordingly different for each column in type and operation.

Such series connection of three different columns is shown in Fig. 5, where block 23 represents a first column connected over dotted line 24 (schematically representing a pipe line containing the flow of a partially degassed liquid) to a second block 25 representing a second fill body column. Dotted line 26 represents another pipe line in which in the direction of the arrow the liquid degassed in column 25 is fed to a third column 27, also represented in block form.

Fig. 6 also shows how the liquid to be degassed and flowing from a column 28 of the type shown in Fig. 1 or 3. can be fed back to that column for further degassing. In Fig. 6, block 28 represents such a column. Full line 29 represents the pipe line 15 of Fig. 1, full line 30 the pipe line 14 of Fig. 1. Dotted line 31, connecting 30 and 29, represents a pipe line through which liquid, already partially degassed by a first passage through the column, is fed back again to that column.

The arrangement of Figs. 1, 2 or 3 can not only be used for degassing but also for topping off, i. e. for distillation of relatively small quantities of low temperature-boiling products, i. e. so-called "top boiling," or for fractional distillation of liquids and their mixtures.

In this case, in front of the sucking pump equipment, a fluid condenser 19′, as shown in Fig. 3, is arranged. Alternatively, this fluid condenser can also be placed inside container 12 as a manner well known per se which, therefore, need not to be described in further detail.

The evaporation heat required for distillation will be derived from the pre-heated and/or intermediately heated liquid. In this case, evaporation heat will be supplied to the liquid by heat exchange, otherwise well known in the art.

For fractional distillation it is preferable to connect in series several of the fill body columns of the type described above, whereby in each column only one fraction will be distilled and condensed while the residue flowing down will be transported by a pump at a point arranged behind this column to the next column. At the same time, the residue will be again brought up to the required temperature of distillation, as schematically indicated in the block diagram of Fig. 5, at 32 and 33 respectively.

Total distillation of a liquid can also be achieved for example in a single column without exceeding the scope of the invention, provided the residue flowing down is fed back through a pump to the top of the column and at the same time brought to distillation temperature, as schematically indicated in the block diagram of Fig. 6 at 34.

We claim:

1. In an arrangement for the degasification and distillation of a liquid, a vacuum enclosure and mounted therein a stationary container having irregularly arranged therein at least one vertical column of predeterminedly shaped fill bodies forming an evaporation surface which is substantially larger than the cross section of said vertical column; said fill bodies being otherwise substantially inactive, and said container having a substantially vertical side wall which is gas transmissive over substantially its entire surface surrounding said column, means for feeding liquid to said column from the top including means for distributing said liquid over the top layer of said column; the horizontal cross section of said column being substantially smaller than the extension of said side wall to force passage of gas from said column through said entire side wall in a direction substantially perpendicular to the flow of liquid through said column, and means for withdrawing liquid from the bottom of said column.

2. Arrangement according to claim 1 comprising means for maintaining in said vacuum enclosure a pressure of the order of not more than one millimeter of mercury.

3. Arrangement according to claim 1 comprising means for heating said liquid to distillation temperature before it enters said column.

4. Arrangement according to claim 1 comprising at least one additional column, means for feeding liquid from the bottom of said first column to the top of said additional column, said different columns being arranged in separate containers of different enclosures, and means for heating the liquid while it is passed from one column to the other.

5. Arrangement according to claim 1 comprising means for feeding back liquid from the bottom to the top of the same column and heating the liquid while it is fed back.

6. Arrangement according to claim 1 wherein said sidewall consists of perforated metal.

7. Arrangement according to claim 1 wherein said column is arranged in a container defined by two substantially concentric vertical cylinders forming therebetween a space containing the fill bodies and having inner and outer vertical walls transmissive to the gas.

8. Arrangement according to claim 1 comprising evacuating means connected to said enclosure, and condensing means arranged between said evacuating means and said enclosure.

9. In a process for the degasification and distillation of liquids, the steps of heating the liquid to distillation temperature, causing the liquid to flow from the top downward substantially in vertical direction and over the entire cross section of a large number of irregularly arranged predeterminedly shaped fill bodies forming an evaporation surface which is substantially larger than said cross section and forming at least one substantially vertical stationary column, said fill bodies being otherwise substantially inactive; and said column having an outer cylindrical surface which is large compared to the horizontal cross section of said column through said entire cylindrical surface of said column and evacuating gas from said column in a direction substantially perpendicular to the direction of the flow of said liquid, and withdrawing liquid at the bottom of said column.

10. Process according to claim 9 wherein said fill bodies are arranged in at least one column having an annular cross section; and wherein gas is evacuated from both inner and outer cylindrical surfaces of said column.

11. Process according to claim 9 comprising the step of condensing the gas evacuated from said cylindrical surface.

12. Process according to claim 9 comprising the step of causing the liquid to flow from the bottom of said vertical column to the top of an additional vertical column, and intermediately heating said liquid, said different vertical columns being arranged in separate containers of separate enclosures.

13. Process according to claim 9 comprising the step of feeding back liquid withdrawn at the bottom of said column to the top of said column and intermediately heating said liquid.

References Cited in the file of this patent

UNITED STATES PATENTS

| 809,383 | Lowe | Jan. 9, 1906 |
| 1,072,670 | Strite | Sept. 9, 1913 |
| 1,149,027 | Castona | Aug. 3, 1915 |
| 1,356,878 | Newton | Oct. 26, 1920 |
| 1,433,965 | Mills | Oct. 31, 1922 |
| 1,654,925 | Drager | Jan. 3, 1928 |
| 1,838,737 | Boynton et al. | Dec. 29, 1931 |
| 1,898,027 | Winslow | Feb. 21, 1933 |
| 1,969,888 | Gibson | Aug. 14, 1934 |
| 2,408,021 | Hill | Sept. 24, 1946 |
| 2,447,746 | Ferris et al. | Aug. 24, 1948 |
| 2,507,797 | Martin | May 16, 1950 |
| 2,522,005 | Whitlock et al. | Sept. 12, 1950 |

FOREIGN PATENTS

| 346,523 | Great Britain | Apr. 16, 1931 |
| 645,545 | Germany | May 28, 1937 |
| 366,843 | Italy | Jan. 10, 1939 |